United States Patent [19]

McCollum et al.

[11] Patent Number: 4,891,111

[45] Date of Patent: Jan. 2, 1990

[54] CATIONIC ELECTROCOATING COMPOSITIONS

[75] Inventors: Gregory J. McCollum, Gibsonia; Robert R. Zwack, Allison Park; Roger L. Scriven, Gibsonia, all of Pa.

[73] Assignee: PPG Industries, Inc., Pittsburgh, Pa.

[21] Appl. No.: 185,618

[22] Filed: Apr. 25, 1988

[51] Int. Cl.$^4$ .................. C25D 13/06; C25D 13/10; C08K 5/06

[52] U.S. Cl. .................. 204/181.7; 523/415; 523/420; 523/456; 524/378; 524/901

[58] Field of Search .............. 523/404, 414, 415, 420, 523/456; 524/378, 901; 204/181.7

[56] References Cited

U.S. PATENT DOCUMENTS

| | | | |
|---|---|---|---|
| 4,190,564 | 2/1980 | Tominaga et al. | 260/18 PT |
| 4,224,421 | 9/1980 | Streit | 523/420 |
| 4,230,552 | 10/1980 | Schimmel | 204/181.7 |
| 4,419,467 | 12/1983 | Wismer et al. | 523/414 |
| 4,423,166 | 12/1983 | Moriarity | 204/181.7 |
| 4,487,674 | 12/1984 | Jan Al et al. | 204/181 R |
| 4,565,838 | 1/1986 | Paar et al. | 523/414 |
| 4,698,141 | 10/1987 | Anderson | 204/181.7 |
| 4,711,934 | 12/1987 | Paar | 204/181.7 |

*Primary Examiner*—John F. Niebling
*Assistant Examiner*—Ben C. Hsing
*Attorney, Agent, or Firm*—William J. Uhl; Daniel J. Long

[57] ABSTRACT

Cationic electrocoating compositions comprising a cationic electrodepositable resin and particular hydroxyl-free, alkylated polyethers dispersed in an aqueous medium are disclosed. Due to the presence of the polyethers, the compositions electrodeposit at high film builds with good smoothness. However, the polyethers do not result in detrimental effects with regard to the properties of the compositions such as rupture voltage and corrosion resistance of the resultant electrodeposited film. Also, the particular polyethers readily incorporate in the electrodeposition bath, are non-volatile and do not significantly build up in the electrodeposition bath during the electrodeposition process.

7 Claims, No Drawings

CATIONIC ELECTROCOATING COMPOSITIONS

BACKGROUND OF THE INVENTION

1. Field of the Invention:

The present invention relates to cationic electrodeposition compositions and to their use in the method of electrodeposition. More particularly, this invention relates to cationic electrodeposition compositions which are capable of being electrodeposited as thick films.

2. Brief Description of the Prior Art:

Electrodeposition as a coating application method involves deposition of a film-forming composition under the influence of an applied electrical potential. Electrodeposition has become increasingly important in the coatings industry because, by comparison with non-electrophoretic coating means, electrodeposition offers higher paint utilization, outstanding corrosion protection and low environmental contamination. Initially, electrodeposition was conducted with the workpiece being coated serving as the anode. This was familiarly referred to as anionic electrodeposition. However, in 1972, cationic electrodeposition was introduced commercially. Since that time, cationic electrodeposition has steadily gained in popularity and today is by far the most prevalent method of electrodeposition. Throughout the world, more than 80 percent of all motor vehicles produced are given a primer coating by cationic electrodeposition.

One disadvantage associated with many of the cationic electrodeposition coatings is that they electrodeposit as very thin films, that is, on the order of 10 to 20 microns. This shortcoming can be overcome by using relatively large quantities of organic solvent such as glycol monoalkyl ethers and alcohols but this is undesirable because the organic solvents often evaporate from the large open electrodeposition tanks causing their level and their effect on film build to vary. Also, these solvents are lost on baking and pose an air pollution problem.

It is also known in the art to incorporate non-volatile nonreactive components in the electrodeposition bath to effect film build. However, many of these materials must be used at high levels and are undesirable because they adversely affect the rupture voltage of the film during electrodeposition. Also, the properties of the resultant coating such as corrosion resistance, particularly coatings which are undercured, are adversely affected. Also, these materials are often difficult to incorporate into the bath.

The ideal additive would provide a large increase in film build with good appearance. Also, properties such as rupture voltage and corrosion resistance would not be adversely affected. The additive should be non-volatile, easy to incorporate into the bath and also have a limited water solubility such that it will not build up in the bath as the electrodeposition proceeds.

A group of materials that are especially effective in this regard are hydroxyl-free, alkylated polyethers containing at least three ether oxygens per molecule and from 1 to 4 saturated hydrocarbon groups separating the ether groups. The alkyl groups contain on an average of at least 2 carbon atoms. The polyethers are non-volatile and have a limited solubility in water.

SUMMARY OF THE INVENTION

In accordance with the present invention, a cationic electrocoating composition comprising a resinous phase dispersed in an aqueous medium is provided. The resinous phase comprises:

(a) a cationic electrodepositable resin and
(b) a hydroxyl-free, alkylated polyether containing at least 3 ether oxygens per molecule and from 1 to 4 saturated hydrocarbon groups separating the ether oxygens. The alkyl groups contain on average at least 2 carbon atoms. The polyether has a solubility of from 0.1 to 50 parts by weight in 100 parts by weight of water and has a boiling point greater than 250° C.

DETAILED DESCRIPTION

Examples of polyethers which are useful in the practice of the invention include those of the structure:

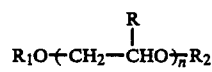

where n is at least 2; R is hydrogen or methyl; $R_1$ and $R_2$ are the same or different and are alkyl groups containing on average, that is, $R + R_2/2$, at least 2 carbon atoms. Preferably, n is from 2 to 4; R is hydrogen and $R_1$ and $R_2$ contain on average from 3 to 10 carbon atoms. Alkyl is meant to include not only unsubstituted alkyl but also substituted alkyl in which the substituent would not adversely affect the stability of the electrodeposition bath nor the properties of the resultant electrodeposition coating. Examples of suitable substituents include aryl, i.e., arylalkyl groups. Specific examples of suitable compounds include tetraethylene glycol dihexyl ether, triethylene glycol dihexyl ether and tetraethylene glycol dibenzyl ether.

These compounds can be prepared by alkylating poly(oxyalkylene) alcohols and glycols with alkyl halides or their equivalents in aqueous medium in the presence of sodium hydroxide. The following procedure can generally be applied to the alkylation of poly(oxyalkylene) glycols and alcohols. Sodium hydroxide (160 grams, 4 moles) and water (160 grams) is charged to a 2-liter flask fitted with a mechanical stirrer, thermometer, heating mantle and nitrogen inlet. (The reaction is blanketed with nitrogen throughout.) When the exothermic dissolution of sodium hydroxide is complete, the mixture is cooled to below 45° C. and the poly(oxyalkylene) glycol or alcohol (1 mole) and tetrabutyl ammonium iodide (2 grams) are added. Hexyl bromide (363.2 grams, 2.2 moles) is then added with vigorous stirring over a 20-minute period while controlling the exotherm to less than 45° C. The mixture is then heated to 60–70° C. and held until about 90–95 percent of the theoretical base has been consumed as measured by titration. The product is then poured into water and the oily layer taken up in 200 ml. of toluene. The toluene layer is washed repeatedly with water, dried over sodium sulfate, filtered and evaporated. The reaction product can be purified by vacuum distillation.

Examples of other polyethers suitable in the practice of the invention are those of the structure:

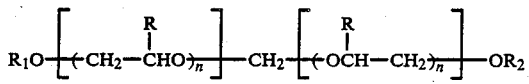

where n is equal to 1 to 4; R is hydrogen or methyl; $R_1$ and $R_2$ are the same or different and are alkyl groups containing on average, i.e., $R_1+R_2/2$, from 2 to 10 carbon atoms. Preferably, n is from 2 to 3; R is hydrogen and $R_1$ and $R_2$ contain on average from 4 to 6 carbon atoms. Examples of suitable compounds include the formals of the monobutyl ether of diethylene glycol and monohexyl ether of diethylene glycol.

These compounds can be prepared by reacting the precursor monoalcohol with formaldehyde in the presence of methane sulfonic acid. A procedure for preparing these compounds is as follows: Two moles of the precursor monoalcohol and one mole of 95 percent paraformaldehyde and methane sulfonic acid (1 percent on formaldehyde) are combined in a flask fitted with a stirrer, heating mantle, thermometer and reflux condenser. The mixture is heated to reflux (about 100–120° C.) and held at reflux for at least 2 hours. The mixture is then cooled to less than 110° C. and an amount of toluene added to produce a new mixture containing about 10 percent by weight toluene. The flask is then fitted with a reflux condenser and a Dean-Stark water trap. The mixture is reheated to reflux and all water removed azeotropically. A 20 percent aqueous solution of sodium carbonate is then added to the mixture such that a ratio of 2 moles of sodium carbonate per mole of methane sulfonic acid results. After stirring for a few hours at room temperature to ensure neutralization of the acid catalyst, the toluene, water and any unreacted alcohol are removed by vacuum distillation. The resulting residue is filtered to remove salts and consists primarily of the desired formal compound. When a primary alcohol is used, this procedure produces a yield of formal of about 80 percent or greater. Secondary alcohols may require use of excess alcohol and longer reaction times. The resulting formal reaction products can be purified by vacuum distillation.

The polyethers of the present invention have a limited solubility in water. Accordingly, the polyethers have a solubility of 0.01 to 50, preferably 0.01 to 10 parts by weight in 100 parts by weight of water measured at 25° C. Solubilities greater than 50 parts by weight are undesirable because of potential film rupturing on deposition and build up in the bath. Solubilities less than 0.01 part by weight tend to be ineffective for film build.

The polyethers also are non-volatile materials having a boiling point (measured at 1 atmosphere) of at least 250 and preferably at least 300° C. Lower boiling materials are undesirable because they will volatilize during the curing cycle resulting in an air pollution problem.

Besides the polyethers of the present invention, the cationic electrocoating compositions of the present invention also contain a cationic electrodepositable resin. The cationic electrodepositable resin is the main film-forming resin in the electrocoating composition. Examples of such film-forming resins include amine salt group-containing resins such as the acid-solubilized reaction products of polyepoxides and primary or secondary amines such as those described in U.S. Pat. Nos. 3,663,389; 3,984,299; 3,947,338 and 3,947,339. Usually, these amine salt group-containing resins are used in combination with a blocked isocyanate curing agent. The isocyanate can be fully blocked as described in the aforementioned U.S. Pat. No. 3,984,299 or the isocyanate can be partially blocked and reacted with the resin backbone such as described in U.S. Pat. No. 3,947,338. Also, one-component compositions as described in U.S. Pat. No. 4,134,866 and DE-OS No. 2,707,405 can be used as the film-forming resin. Besides the epoxy-amine reaction products, film-forming resins can also be selected from cationic acrylic resins such as those described in U.S. Pat. Nos. 3,455,806 and 3,928,157.

Besides amine salt group-containing resins, quaternary ammonium salt group-containing resins can also be employed. Examples of these resins are those which are formed from reacting an organic polyepoxide with a tertiary amine salt. Such resins are described in U.S. Pat. Nos. 3,962,165; 3,975,346 and 4,001,101. Examples of other cationic resins are ternary sulfonium salt group-containing resins and quaternary phosphonium salt group-containing resins such as those described in U.S. Pat. Nos. 3,793,278 and 3,984,922, respectively. Also, film-forming resins which cure via transesterification such as described in European Application No. 12463 can be used. Further, cationic compositions prepared from Mannich bases such as described in U.S. Pat. No. 4,134,932 can also be used.

The resins to which the present invention is particularly effective are those positively charged resins which contain primary and/or secondary amine groups. Such resins are described in U.S. Pat. Nos. 3,663,389; 3,947,339 and 4,116,900. In U.S. Pat. No. 3,947,339, a polyketimine derivative of a polyamine such as diethylenetriamine or triethylenetetraamine is reacted with a polyepoxide. When the reaction product is neutralized with acid and dispersed in water, free primary amine groups are generated. Also, equivalent products are formed when polyepoxide is reacted with excess polyamines such as diethylenetriamine and triethylenetetraamine and the excess polyamine vacuum stripped from the reaction mixture. Such products are described in U.S. Pat. Nos. 3,663,389 and 4,116,900.

The cationic electrodepositable resin described above is present in the cationic electrocoating composition in amounts of about 80 to 99.5, preferably 90 to 99.0 percent by weight based on total weight of cationic electrodepositable resin and polyether. Accordingly, the amount of polyether is from 0.5 to 20, preferably 1 to 10 percent by weight based on total weight of cationic electrodepositable resin and polyether.

The aqueous cationic compositions of the present invention are in the form of an aqueous dispersion. The term "dispersion" is believed to be a two-phase transparent, translucent or opaque resinous system in which the resin is in the dispersed phase and the water is in the continuous phase. The average particle size of the resinous phase is generally less than 10 and usually less than 5 microns, preferably less than 0.5 micron. The concentration of the resinous phase in the aqueous medium is usually at least 1 and usually from about 2 to 60 percent by weight based on weight of the aqueous dispersion. When the compositions of the present invention are in the form of resin concentrates, they generally have a resin solids content of about 26 to 60 percent by weight based on weight of the aqueous dispersion. When the compositions of the present invention are in the form of electrodeposition baths, the resin solids content of the electrodeposition bath is usually within the range of about 5 to 25 percent by weight based on total weight of the aqueous dispersion.

Besides water, the aqueous medium may contain a coalescing solvent. Useful coalescing solvents include hydrocarbons, alcohols, esters, ethers and ketones. The preferred coalescing solvents include alcohols, polyols and ketones. Specific coalescing solvents include isopropanol, butanol, 2-ethylhexanol, isophorone, 4-methoxy-pentanone, ethylene and propylene glycol and the monoethyl, monobutyl and monohexyl ethers of ethylene glycol. The amount of coalescing solvent is generally between about 0.01 and 25 percent and when used, preferably from about 0.05 to about 5 percent by weight based on weight of the aqueous medium.

In some instances, a pigment composition and if desired various additives such as surfactants, wetting agents or catalyst are included in the dispersion. Pigment composition may be of the conventional types comprising, for example, iron oxides, lead oxides, strontium chromate, carbon black, coal dust, titanium dioxide, talc, barium sulfate, as well as color pigments such as cadmium yellow, cadmium red, chromium yellow and the like. The pigment content of the dispersion is usually expressed as a pigment-to-resin ratio. In the practice of the present invention, the pigment-to-resin ratio is usually within the range of 0.02 to 1:1. The other additives mentioned above are usually in the dispersion in amounts of about 0.01 to 3 percent by weight based on weight of resin solids.

When the aqueous dispersions as described above are employed for use in electrodeposition, the aqueous dispersion is placed in contact with an electrically conductive anode and an electrically conductive cathode with the surface to be coated being the cathode. Following contact with the aqueous dispersion, an adherent film of the coating composition is deposited on the cathode when a sufficient voltage is impressed between the electrodes. The conditions under which electrodeposition is carried out are, in general, similar to those used in electrodeposition of other types of coatings. The applied voltage may be varied and can be, for example, as low as 1 volt to as high as several thousand volts, but typically between 50 and 500 volts. The current density is usually between 0.5 ampere and 5 amperes per square foot and tends to decrease during electrodeposition indicating the formation of an insulating film. The coating compositions of the present invention can be applied to a variety of electroconductive substrates especially metals such as steel, aluminum, copper, magnesium and conductive carbon coated materials.

After the coating has been applied by electrodeposition, it is cured usually by baking at elevated temperatures such as 90° -260° C. for about 1 to 40 minutes.

Illustrating the invention are the following examples which, however, are not to be considered as limiting the invention to their details. All parts and percentages in the examples as well as throughout the specification are by weight unless otherwise indicated.

EXAMPLES

The following examples (I-VIII) show the formulation of cationic electrodeposition baths with hydroxyl-free, alkylated polyethers in accordance with the present invention. For the purposes of comparison, cationic electrodeposition baths (Comparative Examples IXa and Xa) with no additive and with a film build additive outside the scope of the present invention were also prepared. Galvanized steel panels were electrodeposited in the bath and the bath evaluated for rupture voltage. Phosphated steel panels were electrodeposited in the bath and the resultant electrodeposited coatings were evaluated for film thickness, smoothness and for corrosion resistance.

Examples XI and XIIa compare the ease of incorporation of a hydroxyl-free, alkylated polyether and a film build additive outside the scope of the present invention into a cationic electrodeposition bath.

EXAMPLE A

A cationic film-forming resin was prepared by reacting a polyepoxide with N-methylethanolamine and the methyl isobutyl diketimine of diethylene triamine. The reaction product was combined with a fully blocked polyisocyanate crosslinking agent and solubilized with acid as generally described in Example B of U.S. Pat. No. 4,419,467 with the exception that aqueous lactic acid (91.2 percent) was used in place of acetic acid. The resin had a solids content of 37.6 percent.

EXAMPLE B

A quaternizing agent for use in preparing a pigment grinding vehicle was prepared from the following mixture of ingredients:

| Ingredients | Parts by Weight | Solids |
| --- | --- | --- |
| 2-ethylhexanol half-capped toluene diisocyanate in methyl isobutyl ketone | 320.0 | 304 |
| Dimethylethanolamine | 87.2 | 87.2 |
| 88% aqueous lactic acid solution | 117.6 | 88.2 |
| 2-butoxyethanol | 39.2 | — |

The 2-ethylhexanol half-capped toluene diisocyanate was added to the dimethylethanolamine in a suitable reaction vessel at room temperature. The mixture exothermed and was stirred for 1 hour at 80° C. Lactic acid was then charged followed by the addition of 2-butoxyethanol. The reaction mixture was stirred for about 1 hour at 65° C. to form the desired quaternizing agent.

EXAMPLE C

A pigment grinding vehicle was prepared from the following mixture of ingredients:

| Ingredients | Parts by Weight | Solids |
| --- | --- | --- |
| EPON 829[1] | 710 | 682 |
| Bisphenol A | 289.6 | 289.6 |
| 2-ethylhexanol monourethane of 2,4-toluene diisocyanate in methyl isobutyl ketone | 406 | 386.1 |
| Quaternizing agent of Example B | 496.3 | 421.9 |
| Deionized water | 71.2 | — |
| 2-butoxyethanol | 1205.6 | — |

[1]Diglycidyl ether of bisphenol A having an epoxy equivalent weight of about 188 commercially available from Shell Chemical Co.

The EPON 829 and bisphenol A were charged under a nitrogen atmosphere to a suitable reaction vessel and heated to 150° to 160° C. to initiate an exotherm. The reaction mixture was permitted to exotherm for 1 hour at 150° to 160° C. The reaction mixture was then cooled to 120° C. and the 2-ethylhexanol half-capped toluene diisocyanate added. The temperature of the reaction mixture was held at 110° to 120° C. for 1 hour followed by the addition of the 2-butoxyethanol. The reaction mixture was then cooled to 85° to 90° C., homogenized and then charged with water followed by the addition of the quaternizing agent. The temperature of the reaction mixture was held at 80° to 85° C. until an acid value of about 1 was obtained.

EXAMPLE D

Dibutyltin oxide catalyst was dispersed in the grinding vehicle prepared as described above in Example C as follows:

| Ingredients | Parts by Weight |
|---|---|
| Pigment grinding vehicle as described in Example C | 145 |
| Deionized water | 321.6 |
| Dibutyltin oxide | 200 |

The ingredients were mixed together and ground in a steel ball mill to a Hegman No. 7 grind.

EXAMPLE E

Titanium dioxide, carbon black, basic lead silicate and dibutyltin oxide were dispersed in the pigment grinding vehicle of Example C as follows:

| Ingredients | Parts by Weight |
|---|---|
| Pigment grinding vehicle as described in Example C | 226.36 |
| Deionized water | 359.58 |
| Titanium dioxide | 564.31 |
| Carbon black | 16.54 |
| Lead silicate | 33.08 |
| Catalyst paste of Example D | 95.33 |

The above ingredients were mixed together in the order indicated and ground in a steel ball mill to a Hegman No. 7 grind.

EXAMPLE F

A polyoxyalkylenepolyamine-polyepoxide adduct useful as an anti-cratering agent was prepared by reacting a polyepoxide with a polyamine. The adduct was then formulated with a polyurethane crosslinker and surfactant and solubilized in water with acetic acid. A polyepoxide intermediate was first prepared by condensing EPON 829 and bisphenol A as follows:

| Ingredients | Parts by Weight |
|---|---|
| EPON 829 | 136.1 |
| Bisphenol A | 39.6 |
| 2-butoxyethanol | 52.3 |

The EPON 829 and bisphenol A were charged to a reaction vessel under a nitrogen blanket and heated to 70° C. to initiate an exotherm. The reaction mixture was allowed to exotherm and held at 180° C. for ½ hour. The reaction mixture was cooled to 160° C. and the 2-butoxyethanol added to give a solids content of 75 percent and an epoxy equivalent of 438 (based on solids).

A polyoxypropylenediamine having a molecular weight of 2000 and commercially available from Jefferson Chemical Company as JEFFAMINE D-2000 was reacted with the polyepoxide intermediate described above as follows:

| Ingredients | Parts by Weight |
|---|---|
| JEFFAMINE D-2000 | 132.7 |
| Polyepoxide intermediate | 67.4 |
| 2-butoxyethanol | 2.4 |

| Ingredients | Parts by Weight |
|---|---|
| Polyurethane crosslinker[1] | 174.5 |
| Acetic acid | 3.9 |
| Surfactant[2] | 7.4 |
| Deionized water | 416.8 |

[1]Polyurethane crosslinker formed from half-capping toluene diisocyanate (80/20 2,4-/2,6-isomer mixture) with 2-butoxyethanol and reacting this product with trimethylolpropane in a 3:1 molar ratio. The crosslinker is present as a 70 percent solids solution in methyl isobutyl ketone and butanol (9:1 weight ratio).
[2]The cationic surfactant was prepared by blending 120 parts of alkyl imidazoline commercially available from Geigy Industrial Chemicals as GEIGY AMINE C, 120 parts by weight of an acetylenic alcohol commercially available from Air Products and Chemicals, Inc. as SURFYNOL 104, 120 parts by weight of 2-butoxyethanol and 221 parts by weight of deionized water and 19 parts by weight of glacial acetic acid.

The JEFFAMINE D-2000 was charged to a reaction vessel under a nitrogen atmosphere and heated to 90° C. The polyepoxide intermediate was added over the period of about ½ hour. At the completion of the addition, the reaction mixture was heated to 130° C., held for 3 hours, followed by the addition of the 2-butoxyethanol and polyurethane crosslinker. The reaction mixture was then solubilized by blending with acetic acid, the surfactant and deionized water. The adduct had a solids content of 38.1 percent.

EXAMPLE I

A cationic electrodeposition bath was formulated with 6 percent by weight of resin solids of the formal of diethylene glycol monobutyl ether as follows:

| Ingredients | Parts by Weight (in grams) |
|---|---|
| Cationic resin of Example A | 1312.2 |
| Additive of Example F | 190.0 |
| Formal of diethylene glycol monobutyl ether | 36.1 |
| Deionized water | 1871.2 |
| Pigment paste of Example E | 390.5 |

The additive and the formal were first mixed together and the mixture further mixed with the cationic resin. The resulting mixture was then thinned with the deionized water under agitation and the pigment paste then blended in under agitation. The resulting cationic electrodeposition bath had a solids content of about 22 percent and a pigment to binder ratio of 0.3/1.0. Prior to use, 40 percent by volume of the electrodeposition bath was ultrafiltered and the ultrafiltrate replaced with deionized water.

Galvanized steel panels were electrodeposited in the bath and the bath evaluated for rupture voltage. Phosphated (BONDERITE 40) steel panels were electrodeposited in the bath at a voltage of 275 volts for 2 minutes at a bath temperature of 83° F. (28° C.). The coating was then cured at 340° F. (171° C.) for 30 minutes and the smoothness and thickness of the coating determined. Coated bimetallic coach joints were also slightly undercured at 330° F. (166° C.) for 30 minutes and subjected to corrosion testing. The results are reported in the table below.

EXAMPLE II

A cationic electrodeposition bath similar to that of Example I was prepared with the exception that 4 percent by weight of the formal of diethylene glycol monobutyl ether was used.

| Ingredients | Parts by Weight (in grams) |
|---|---|
| Cationic resin of Example A | 1344.1 |
| Additive of Example F | 190.0 |
| Formal of diethylene glycol monobutyl ether | 24.1 |
| Deionized water | 1796.3 |
| Pigment paste of Example E | 390.5 |

The bath was formulated as described in Example I. Galvanized and phosphated steel panels were electrodeposited and the electrodeposited coating cured as described in Example I. The rupture voltage of the bath, the thickness and smoothness of the fully cured coating and salt spray corrosion resistance of the undercured coating were determined as described in Example I. The results are reported in the table below.

EXAMPLE III*

A cationic electrodeposition bath similar to that of Example I was prepared with the exception that 0.5 percent by weight of the formal of diethylene glycol monobutyl ether was used.

| Ingredients | Parts by Weight (in grams) |
|---|---|
| Cationic resin of Example A | 1400.3 |
| Additive of Example F | 190.0 |
| Formal of diethylene glycol monobutyl ether | 3.0 |
| Deionized water | 1816.2 |
| Pigment paste of Example E | 390.5 |

The bath was prepared as described in Example I. Galvanized and phosphated steel panels were electrodeposited in the bath and the electrodeposited coating cured under the conditions described in Example I. The rupture voltage of the bath, the thickness and smoothness of the fully cured coating and the salt spray corrosion resistance of the undercured coating were determined and are reported in the table below.

EXAMPLE IV

A cationic electrodeposition bath similar to Example I was prepared with the exception that 20 percent by weight of the formal of diethylene glycol monobutyl ether was used.

| Ingredients | Parts by Weight (in grams) |
|---|---|
| Cationic resin of Example A | 1088.3 |
| Additive of Example F | 190.0 |
| Formal of diethylene glycol monobutyl ether | 120.3 |
| Deionized water | 2010.9 |
| Pigment paste of Example E | 390.5 |

The bath was prepared as described in Example I. Galvanized and phosphated steel panels were electrodeposited in the bath and the electrodeposited coating cured under the conditions described in Example I. The rupture voltage of the bath, the thickness and smoothness of the fully cured coating and the salt spray corrosion resistance of the undercured coating were determined and reported in the table below.

EXAMPLE V

A cationic electrodeposition bath similar to that of Example I was prepared with the exception that 6 percent by weight of the dihexyl ether of tetraethylene glycol was used.

| Ingredients | Parts by Weight (in grams) |
|---|---|
| Cationic resin of Example A | 1312.2 |
| Additive of Example F | 190.0 |
| Dihexyl ether of tetraethylene glycol | 36.1 |
| Deionized water | 1871.2 |
| Pigment paste of Example E | 390.5 |

The bath was prepared as generally described in Example I. Galvanized and phosphated steel panels were electrodeposited in the bath and the electrodeposited coating cured under the conditions described in Example I. The rupture voltage of the bath, the thickness and smoothness of the fully cured coating and the salt spray corrosion resistance of the undercured coating were determined and are reported in the table below.

EXAMPLE VI

A cationic electrodeposition bath was prepared as generally described in Example I with the exception that 6 percent by weight of the dihexyl ether of triethylene glycol was used.

| Ingredients | Parts by Weight (in grams) |
|---|---|
| Cationic resin of Example A | 1312.2 |
| Additive of Example F | 190.0 |
| Dihexyl ether of triethylene glycol | 36.1 |
| Deionized water | 1871.2 |
| Pigment paste of Example E | 390.5 |

The bath was prepared as generally described in Example I. Galvanized and phosphated steel panels were electrodeposited in the bath and the electrodeposited coating cured under the conditions described in Example I. The rupture voltage of the bath, the thickness and smoothness of the fully cured coating and the salt spray corrosion resistance of the undercured coating were determined and are reported in the table below.

EXAMPLE VII

A cationic electrodeposition bath similar to Example I was prepared with the exception that 6 percent by weight of the dibenzyl ether of tetraethylene glycol was used.

| Ingredients | Parts by Weight (in grams) |
|---|---|
| Cationic resin of Example A | 1312.2 |
| Additive of Example F | 190.0 |
| Dibenzyl ether of tetraethylene glycol | 36.1 |
| Deionized water | 1871.2 |
| Pigment paste of Example E | 390.5 |

The bath was prepared as generally described in Example I. Galvanized and phosphated steel panels were electrodeposited in the bath and the electrodeposited coating cured under the conditions described in Example I. The rupture voltage of the bath, the thickness and smoothness of the fully cured coating and the salt spray corrosion resistance of the undercured coating were determined and are reported in the table below.

EXAMPLE VIII

A cationic electrodeposition bath similar to that of Example I was prepared with the exception that 6 percent by weight of the formal of diethylene glycol monohexyl ether was used.

| Ingredients | Parts by Weight (in grams) |
| --- | --- |
| Cationic resin of Example A | 1312.2 |
| Additive of Example F | 190.0 |
| Formal of diethylene glycol monohexyl ether | 36.1 |
| Deionized water | 1871.2 |
| Pigment paste of Example E | 390.5 |

The bath was prepared as generally described in Example I. Galvanized and phosphated steel panels were electrodeposited in the bath and the electrodeposited coating cured under the conditions described in Example I. The rupture voltage of the bath, the thickness and smoothness of the fully cured coating and the salt spray corrosion resistance of the undercured coating were determined and are reported in the table below.

COMPARATIVE EXAMPLE IXA

For the purposes of control, a cationic electrodeposition bath similar to that of Example I was prepared with the exception that no film build additive was included in the formulation.

| Ingredients | Parts by Weight (in grams) |
| --- | --- |
| Cationic resin of Example A | 1408.2 |
| Additive of Example F | 190.0 |
| Deionized water | 1811.3 |
| Pigment paste of Example E | 390.5 |

The bath was prepared as generally described in Example I. Galvanized and phosphated steel panels were electrodeposited in the bath and the electrodeposited coating cured under the conditions described in Example I. The rupture voltage of the bath, the thickness and smoothness of the fully cured coating and the salt spray corrosion resistance of the undercured coating were determined and are reported in the table below.

COMPARATIVE EXAMPLE XA

For the purposes of comparison, a cationic electrodeposition bath similar to that of Example I was prepared with the exception that a film build additive outside the scope of the claims of the present invention was used. The film build additive was a propoxylated cresol available from Rohm and Haas as PARAPLEX WP-1.

| Ingredients | Parts by Weight (in grams) |
| --- | --- |
| Cationic resin of Example A | 1312.2 |
| Additive of Example F | 190.0 |
| PARAPLEX WP-1 | 36.1 |
| Deionized water | 1871.2 |
| Pigment paste of Example E | 390.5 |

The bath was prepared as generally described in Example I. Galvanized and phosphated steel panels were electrodeposited in the bath and the electrodeposited coating cured under the conditions described in Example I. The rupture voltage of the bath, the thickness and smoothness of the fully cured coating and salt spray corrosion resistance of the undercured coating were determined and are reported in the table below.

TABLE

Film Thickness and Corrosion Resistance of Coated Panels of Examples I–VIII and IXa and Xa

| Example No. | Film Build Additive (%) | Film Thickness (in mils)[1] | Condition of Film (Smooth or Rough) | Corrosion Resistance[2] | Rupture Voltage[3] (mil) |
| --- | --- | --- | --- | --- | --- |
| I | formal of diethylene glycol monobutyl ether (6%) | 1.75 | Smooth | 5 | <.82 |
| II | formal of diethylene glycol monobutyl ether (4%) | 1.35–1.45 | Smooth | 5 | <.67 |
| III | formal of diethylene glycol monobutyl ether (0.5%) | 1.16–1.20 | Smooth | 6 | >1.25 |
| IV | formal of diethylene glycol monobutyl ether (20%) | 2.8–2.95 | Smooth | 7 | <.65 |
| V | dihexyl ether of tetraethylene glycol (6%) | 1.65 | Smooth | 5 | <.87 |
| VI | dihexyl ether of triethylene glycol (6%) | 1.77–1.85 | Smooth | 4 | <.75 |
| VII | dibenzyl ether of tetraethylene glycol (6%) | 1.57–1.62 | Smooth | 2 | <.56 |
| VIII | formal of diethylene glycol monohexyl ether (6%) | 1.75 | Smooth | 6 | <.58 |
| IXa | none | 0.8–0.88 | Rough | 7 | >1.16 |
| Xa | propoxylated cresol (6%) | 1.32–1.45 | Smooth | 3 | 0.75 |

[1]Film thickness measured with an electronic film thickness meter, i.e., Permascope ES manufactured by the Twin City Manufacturing Corp.
[2]The corrosion testing is done on a bimetallic coach joint which comprises two L-shaped steel panels welded together on a common side. One steel panel is galvanized steel and the other is phosphated (BONDERITE 40) steel. The test is conducted in general in accordance with the scab corrosion creepage testing procedure (TM 54-26) of the Fisher Body Division of the General Motors Corporation. The coated panels are exposed to the following conditions:
1. Monday through Sunday
(a) 15 minutes immersion in 5% aqueous sodium chloride solution;
(b) 1 hour and 15 minutes exposure to room temperature;
(c) 22 hours and 30 minutes exposure in a humidity cabinet operated at 60° C. and 85% relative humidity.
2. Monday only
(a) One hour exposure in a 60° C. air circulating oven;
(b) 30 minute exposure in a −10° C. cold cabinet;
(c) 15 minutes immersion in 5% aqueous sodium chloride solution;
(d) 1 hour and 15 minutes exposure to room temperature;
(e) 21 hour exposure in the humidity cabinet.
One day constitutes one cycle and the panels are exposed to 25 cycles. After completion of the corrosion testing, the panels are rinsed with warm flowing water not exceeding 100° F. (38° C.), dried and the corrosion creep back along the welded joint evaluated. The corrosion creep back (loss of adhesion between the coating and the steel) is determined by measuring the distance between the unaffected primer on each side of the joint line. Values of 0 to 10 are assigned. Ten(10) is excellent with no corrosion creep back and zero (0) being very poor with extensive film delamination.
[3]Rupture voltage is determined indirectly by the resistance of the coating to form pinholes (small ruptures) during the electrodeposition process over galvanized steel substrates. In this test, electrodeposition is conducted at 260 volts at a bath temperature of 90° F. (32° C.) for various times to get a film thickness which will not show pinholing. The shorter the time, the thinner the film. The thinner the film that forms without pinholing, the greater the rupture voltage.

EXAMPLE XI

To a cationic electrodeposition bath as described in Example IXa was added six (6) percent by weight based on weight of resin solids of the film build additive of Example I (formal of diethylene glycol monobutyl ether). The mixture was stirred on a magnetic stirring plate for five minutes. Zinc phosphated steel panels were electrodeposited in the bath at 275 volts for two minutes at a bath temperature of 82° F. (28° C.). The coating was then cured at 340° F. (171° C.) for 30 minutes. The cured coating had a thickness of 1.2–1.3 mils, was smooth with no craters, evidencing easy and essentially complete incorporation of the additive into the electrodeposition bath.

COMPARATIVE EXAMPLE XIIA

In a manner analogous to Example XI, six (6) percent by weight of the film build additive of Example Xa (PARAPLEX WP-1) was added to the cationic electrodeposition bath of Example IXa. The mixture was stirred on a magnetic stirring plate for five minutes. Zinc phosphated steel panels were electrodeposited and the resulting coating cured as described in Example XI. The cured coating had a thickness of 1.18–1.25 mils but was extremely cratered evidencing incomplete incorporation of the additive into the electrodeposition bath. It took 30 minutes of stirring to incorporate the additive into the bath such that the resultant cured electrodeposited coating was essentially free of craters.

We claim:

1. A cationic electrocoating composition comprising a resinous phase dispersed in an aqueous medium, said resinous phase comprising:
   (a) a cationic electrodepositable resin and
   (b) a hydroxyl-free, fully alkylated polyether containing at least 3 ether oxygens per molecule and from 1 to 4 saturated hydrocarbon groups separating the ether oxygens; the alkyl groups containing an average at least 2 carbon atoms; said polyether having a solubility of 0.01 to 50 parts by weight in 100 parts by weight of water at 25° C. and having a boiling point greater than 250° C., wherein the fully alkylated polyether is selected from a group consisting of fully alkylated polyethers having the structure

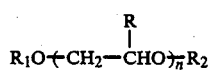

where n is at least 2; R is hydrogen or methyl; $R_1$ and $R_2$ are the same or different and are alkyl groups containing on average at least 2 carbon atoms, and fully alkylated polyethers having the structure

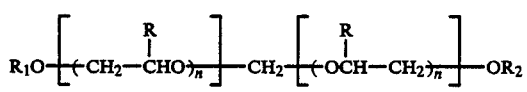

where n is 1 to 4; R is hydrogen or methyl; $R_1$ and $R_2$ are the same or different and are alkyl groups containing on average from 2 to 10 carbon atoms.

2. The cationic electrocoating composition of claim 1 in which the dispersed resinous phase is present in amounts of about 2 to 60 percent by weight based on total weight of the electrocoating composition.

3. The cationic electrocoating composition of claim 1 in which the cationic electrodepositable resin (a) is present in amounts of about 80 to 99.5 percent by weight based on weight of (a) and (b).

4. The cationic electrocoating composition of claim 1 in which the fully alkylated polyether (b) is present in amounts of about 0.5 to 20 percent by weight based on weight of (a) and (b).

5. The cationic electrocoating composition of claim 1 in which n is from 2 to 4; R is hydrogen and $R_1$ and $R_2$ contain on average from 3 to 10 carbon atoms.

6. The cationic electrocoating composition of claim 1 in which n is from 2 to 3; R is hydrogen and $R_1$ and $R_2$ contain on average from 4 to 6 carbon atoms.

7. A method for coating a conductive substrate serving as a cathode in an electrical circuit comprising said cathode and an anode immersed in an aqueous cationic electrocoating composition comprising passing electric current between said anode and said cathode so as to cause the electrocoating composition to deposit as a coating on the cathode, characterized in that said electrocoating composition is a cationic electrocoating composition comprising a resinous phase dispersed in an aqueous medium, said resinous phase comprising:
   (a) a cationic electrodepositable resin and
   (b) a hydroxyl-free, fully alkylated polyether containing at least 3 ether oxygens per molecule and from 1 to 4 saturated hydrocarbon groups separating the ether oxygens; the alkyl groups containing on average at least 2 carbon atoms; said polyether having a solubility of 0.01 to 50 parts by weight in 100 parts by weight of water at 25° C. and having a boiling point greater than 250° C., wherein the fully alkylated polyether is selected from a group consisting of fully alkylated polyethers having the structure

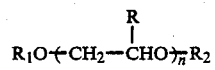

where n is at lesat 2; R is hydrogen or methyl; $R_1$ and $R_2$ are the same or different and are alkyl groups containing on average at least 2 carbon atoms, and fully alkylated polyethers having the structure

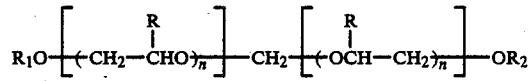

where n is 1 to 4; R is hydrogen or methyl; $R_1$ and $R_2$ are the same or different and are alkyl groups containing on average from 2 to 10 carbon atoms.

* * * * *